Dec. 24, 1957
R. D. BOND
2,817,460
SPREADER FOR LAWNS AND SMALL GARDENS
Filed Nov. 18, 1954
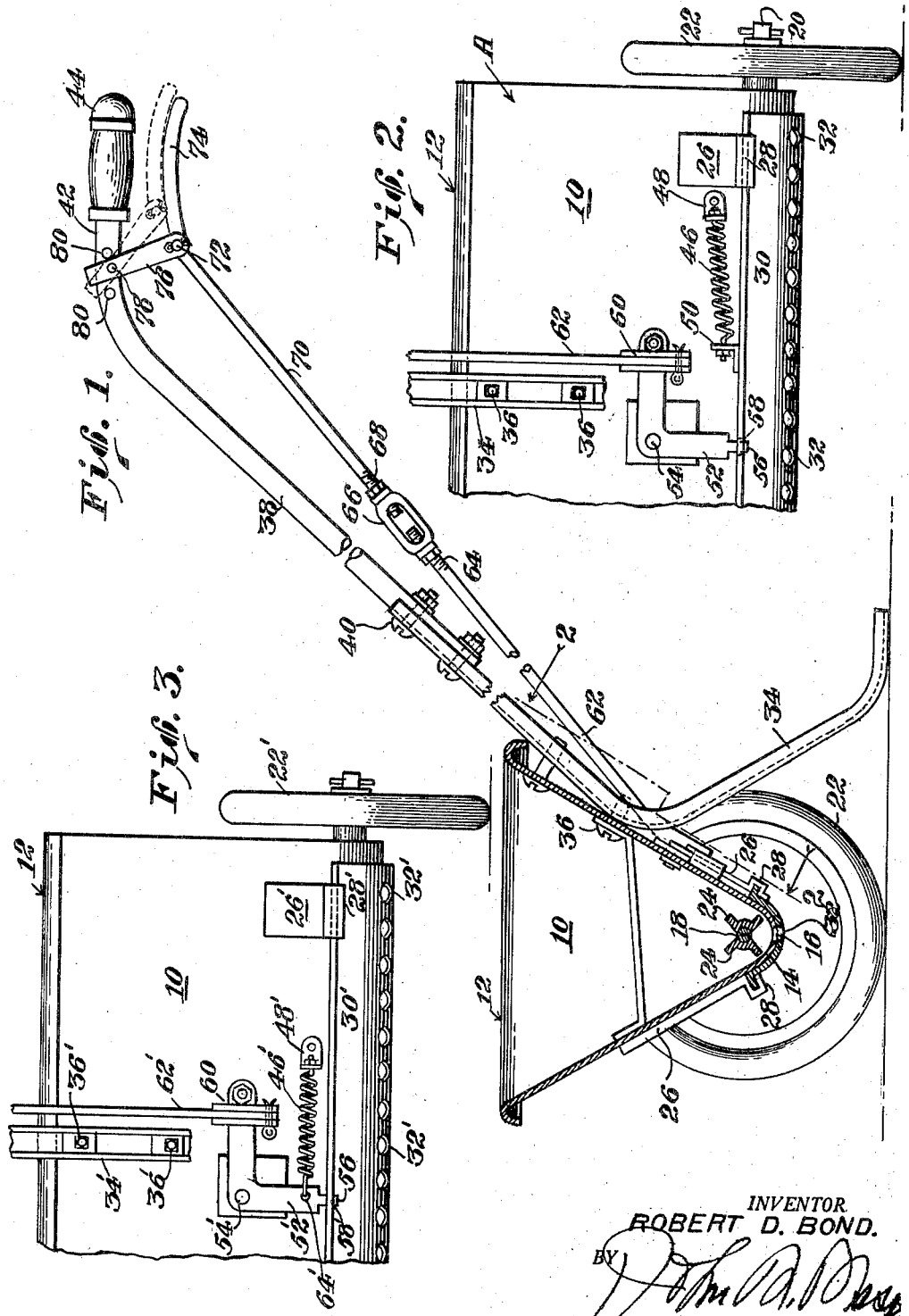
INVENTOR.
ROBERT D. BOND.
BY
Attorneys.

United States Patent Office 2,817,460
Patented Dec. 24, 1957

2,817,460

SPREADER FOR LAWNS AND SMALL GARDENS

Robert D. Bond, Detroit, Mich., assignor to Douglas Machine Products Co., Wyandotte, Mich., a corporation of Michigan Application November 18, 1954, Serial No. 469,779

2 Claims. (Cl. 222—177)

This invention relates to a manually operated spreader for depositing seed, fertilizer, and other material on a lawn or on a small garden.

An object of the invention is to provide in a structure of the type set forth, a hand operated means for controlling the feeding of the material from the spreader onto the surface to be treated.

Another object is to provide means for automatically shutting off the feed of the material from the spreader to the lawn or garden.

A further object is the provision of means for cutting off the feed of the deposited material at the exact place desired by the operator.

An additional object is to provide a spring acting cut-off member which member is biased to cut-off position, and which is released by the hand of the operator.

Still another object is to provide in a spreader having a handle for guiding the spreader, and in some cases pushing the spreader, an automatic cut-off lever, biased to cut-off position, where there is no time lag, and the closing of the depositing openings is accomplished automatically by the action of spring means.

This invention is an improvement of the invention shown, described, and claimed in our co-pending application, Serial No. 386,338, filed October 15, 1953, now Patent No. 2,767,885 of which it is a continuation-in-part. As distinguished from the original disclosure, and as an additional object of the invention, the present invention is particularly directed to the elimination of several of the parts, and to the simplification of the structure of the original invention.

Other objects will appear hereinafter throughout the specification.

In the drawings:

Figure 1 is a side elevational view with parts in section, showing a spreader and cut-off means therefor;

Figure 2 is a view taken on the line 2—2 of Figure 1; and

Figure 3 is a view similar to Figure 2 of a slightly modified form of the invention.

The present invention is directed particularly to a spreader of the type which is used for spreading fertilizer or seed or both onto a lawn, and which includes means for instantly disconnecting the feed of the fertilizer or seed along a line, beyond which it is not desired to deposit this material, without stopping the movement of the spreader over the ground, and by merely releasing the hand operated lever.

In the drawings, A indicates the spreader as a whole. The spreader is provided with a receptacle 10 having an open top 12. The sides of the trough form a V and converge toward the trough bottom 14, and this is provided with a plurality of spaced apertures 16.

Extending laterally through the trough adjacent the trough bottom is a shaft 18. One or both ends of the shaft are flattened as shown at 20 for the mounting thereon of the wheels 22, or they may be splined to the shaft 18 so that rotation of the wheels over the ground will cause rotation of the shaft 18. Fixedly mounted by welding, or by rivets, not shown, are the blades 24. As the shaft 18 rotates, the blades 24 are caused to rotate to break up the material, mix it and feed it toward the openings 16.

Located on the opposite sides of each of the inclined sides of the receptacle are the guides 26. Each of these guides has a lower portion 28 which is U-shaped in cross section. These guides retain and position sliding shut-off member 30 whose lower central portion is provided with a series of apertures. These apertures correspond in number and spacing to apertures 16.

A combined supporting foot and lower handle section is indicated by the numeral 34 which is attached to receptacle 10 by bolts 36.

The upper handle section 38 is provided with bolts 40 detachably connecting the sections 34 and 38 to each other.

The upper handle section 38 has a curved end 42 on which is mounted a hand grip 44.

The sliding shut-off member 30 is biased to a position where the apertures 32 and 18 are disaligned by a spring 46 whose right end is anchored to the receptacle 10 at 48, and whose left end is anchored at 50 to shut-off plate 30, as seen in Figure 2.

Plate 30 is moved against the tension of spring 48 to a position where the apertures are aligned by means of a bell crank 52, pivoted at 54 to receptacle 10. This bell crank has a tongue 56 that engages the slot 58 and shut-off member 30. The opposite end of the bell crank is connected by means of a loose joint 60 to lower rod 62 whose upper end is threaded at 64 to turn buckle 66 which latter is also threaded at 68 to upper rod 70. These are right and left hand threads.

The upper rod is pivoted at 72 to a handle member 74, which has an extension 76 that is pivoted at 78 to the curved end 42 of the upper handle section 38. This curved handle 42 is provided with a plurality of stops 80 which limit the movement of the extension in either direction about pivot 78, as shown in full and dotted lines in Figure 1.

The structure shown in Figure 3 is in all respects similar to that shown in Figures 1 and 2 except for the placement of the spring 46 in Figure 2.

Referring to Figure 3, the receptacle 10' is provided with wheels 22', and a sliding shut-off member 30' having apertures 32' which are adapted to be aligned or disaligned with apertures such as the apertures 16 shown in Figure 1.

The combined supporting foot is indicated at 34' and is attached to the receptacle at 36'. Bell crank 52' has a tongue 56' that engages in slot 58', the bell crank being pivoted at 54'. It is provided with a loose connection at 60' with lower rod 62'. The lower rod is connected to the upper rod by a turn buckle, and the other parts shown, and the other operating parts of the handle corresponding to numbered parts 72, 74, 76, 78, 80, 42, and 44 are similar or identical to those shown in Figure 1.

Referring again to Figure 3, spring 46' is anchored at 48' to receptacle 10'. The opposite ends 50' of the spring engages an eye or aperture 64' in the lower arm of the bell crank lever 52'. It will be noted by comparing the present disclosure with our parent application, that there is no spring means in the handle, but this spring means has been removed from the handle so that one end of the spring is anchored on the receptacle, and the other end is anchored either to the sliding shut-off member 30 or to the bell crank 52' as seen in Figures 2 and 3, respectively.

The above description and drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

Having thus described the invention, what is claimed as new, and what is desired to be secured by Letters Patent is:

1. In a hand operated spreader for lawns and gardens, said spreader having wheels, a receptacle supported by said wheels, shaft means for said wheels extending into said receptacle adjacent the bottom thereof, a series of spaced apertures in the bottom of said receptacle, blade means mounted on said shaft means and driven thereby, means drivingly connecting at least one of said wheels to said shaft means, a handle section connected to said spreader for propelling the same over a surface, a sliding shut-off member having a plurality of spaced apertures, means mounting said shut-off member on the said receptacle adjacent the exterior lower end thereof: the combination with said spreader of means for aligning and disaligning the apertures in said receptacle with those of the shut-off member comprising a shut-off handle lever, means pivotally connecting said handle lever to said shut-off member and to said handle section, biasing means comprising a spring having one of its ends connected to said receptacle and its other end connected to said means for aligning and disaligning the apertures in said receptacle.

2. In a hand operated spreader for lawns and gardens, said spreader having wheels, a receptacle supported by said wheels, shaft means for said wheels extending into said receptacle adjacent the bottom thereof, a series of spaced apertures in the bottom of said receptacle, blade means mounted on said shaft means and driven thereby, means drivingly connecting at least one of said wheels to said shaft means, a handle section connected to said spreader for propelling the same over a surface, a sliding shut-off member having a plurality of spaced apertures, means mounting said shut-off member on the said receptacle adjacent the exterior lower end thereof: the combination with said spreader of means for aligning and disaligning the apertures in said receptacle with those of the shut-off member comprising a shut-off handle lever, means pivotally connecting said handle lever to said shut-off member and to said handle section comprising a bell crank, biasing means comprising a spring having one of its ends anchored to said receptacle and its other end anchored to said bell crank.

References Cited in the file of this patent
UNITED STATES PATENTS

| | | |
|---|---|---|
| 352,158 | Snyder | Nov. 9, 1886 |
| 1,886,106 | Kean | Nov. 1, 1932 |
| 1,888,821 | Fearn | Nov. 22, 1932 |
| 2,678,145 | Juzwiak et al. | May 11, 1954 |